United States Patent
Bonnamour et al.

[11] Patent Number: 5,889,832
[45] Date of Patent: Mar. 30, 1999

[54] NUCLEAR REACTOR CONTROL CLUSTER HAVING REMOVABLE RODS

[75] Inventors: Michel Bonnamour, Lyons; Pascal Burfin, Saint-Genis-Les-Ollieres, both of France

[73] Assignees: Framatome, Courbevoie; Compagnie Generale des Matières Nucléaires, Velizy-Villacoublay, both of France

[21] Appl. No.: 774,015
[22] Filed: Dec. 26, 1996

[30] Foreign Application Priority Data

Dec. 26, 1995 [FR] France .................................. 95 15488

[51] Int. Cl.⁶ ....................................................... G21C 7/10
[52] U.S. Cl. .......................... 376/327; 376/225; 376/234
[58] Field of Search ................................. 376/327, 353, 376/224, 225, 234, 446

[56] References Cited

U.S. PATENT DOCUMENTS

| | | | |
|---|---|---|---|
| 2,994,655 | 8/1961 | Taylor, Jr. ................................. | 376/234 |
| 3,324,006 | 6/1967 | Challender et al. ..................... | 376/224 |
| 3,448,006 | 6/1969 | Fortescue et al. ....................... | 376/234 |
| 3,481,832 | 12/1969 | Rickert .................................... | 376/224 |
| 3,595,748 | 7/1971 | Frisch et al. ............................. | 376/353 |
| 3,816,245 | 6/1974 | Bevilacqua .............................. | 376/353 |
| 4,019,954 | 4/1977 | Giordano et al. ........................ | 376/234 |
| 4,035,230 | 7/1977 | Bevilacqua .............................. | 376/225 |
| 4,073,684 | 2/1978 | Cepkauskas ............................. | 376/225 |
| 4,684,503 | 8/1987 | Shallenberger ......................... | 376/444 |
| 4,752,434 | 6/1988 | Savary .................................... | 376/234 |
| 4,826,648 | 5/1989 | Savary .................................... | 376/225 |
| 4,855,100 | 8/1989 | Shallenberger et al. ................ | 376/327 |
| 4,928,291 | 5/1990 | Mouesca et al. ........................ | 376/327 |
| 5,106,572 | 4/1992 | Chevereau ............................... | 376/234 |
| 5,141,711 | 8/1990 | Gjertsen et al. ......................... | 376/327 |
| 5,183,626 | 2/1993 | Denizou .................................. | 376/327 |

FOREIGN PATENT DOCUMENTS

| | | | |
|---|---|---|---|
| 0158812 | 3/1985 | European Pat. Off. . | |
| 0159509 | 3/1985 | European Pat. Off. . | |
| 0159509 | 10/1985 | European Pat. Off. ............... | 376/327 |
| 0249544 | 6/1987 | European Pat. Off. . | |
| 3732573 | 1/1989 | Germany ................................. | 376/327 |
| 1200494 | 9/1986 | Japan ....................................... | 376/234 |
| 2179195 | 2/1987 | United Kingdom .................... | 376/327 |

*Primary Examiner*—Harvey E. Behrend
*Attorney, Agent, or Firm*—Pollock, Vande Sande & Amernick

[57] ABSTRACT

The control cluster has a spider constituted by a hub connectable to a drive shaft. Fins radiate from a bottom portion of the hub and provided with vertical fingers distributed in a regular array. It also includes rods provided with plugs that are releasably fixed to the fingers. The fins, their fingers, and at least the bottom portion of the hub constituting a single-piece part obtained by molding or by electro-machining.

5 Claims, 9 Drawing Sheets

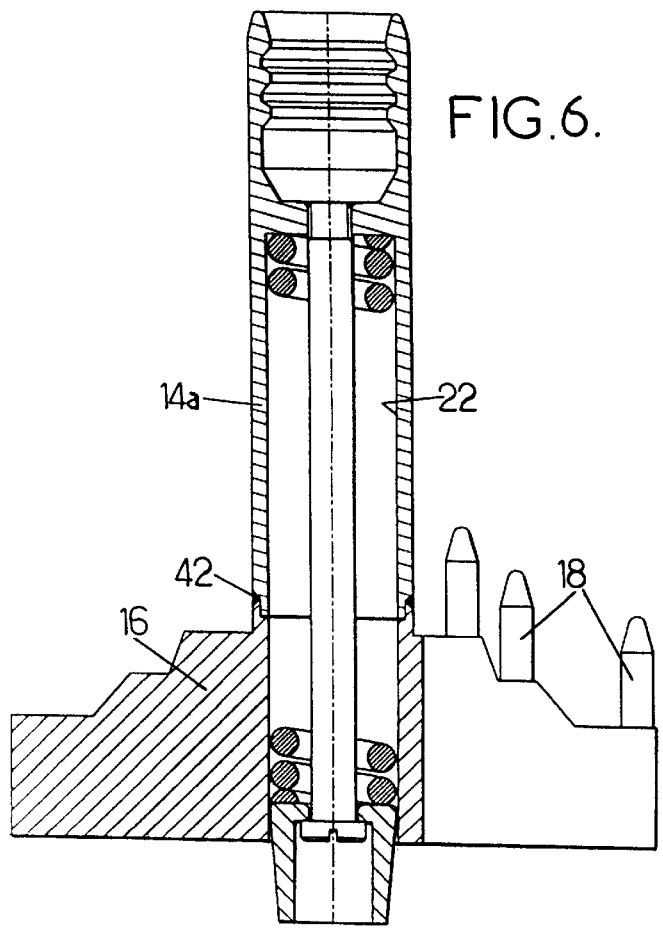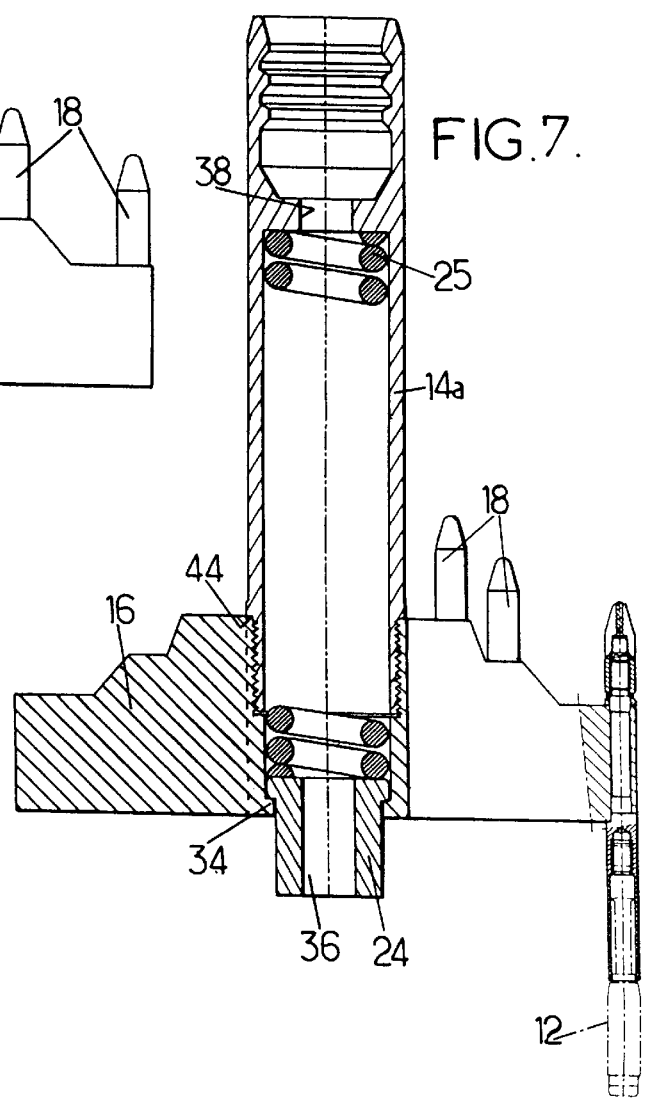

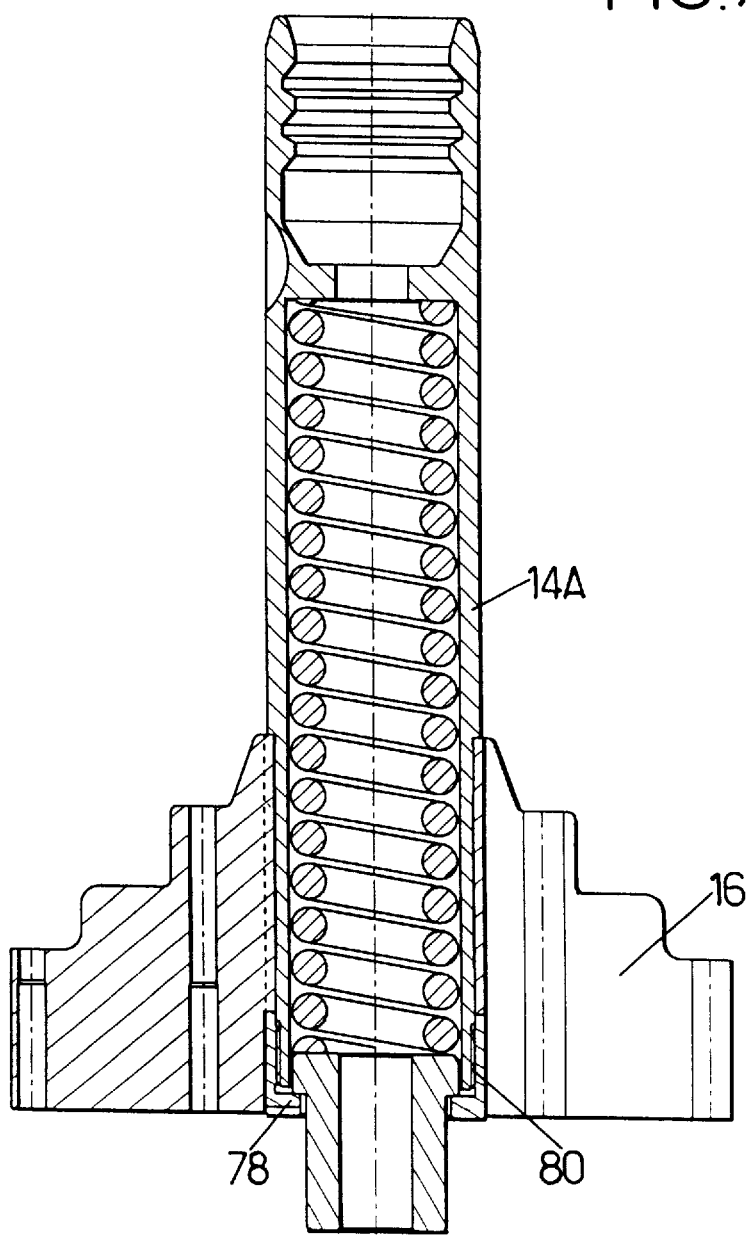

FIG.13.
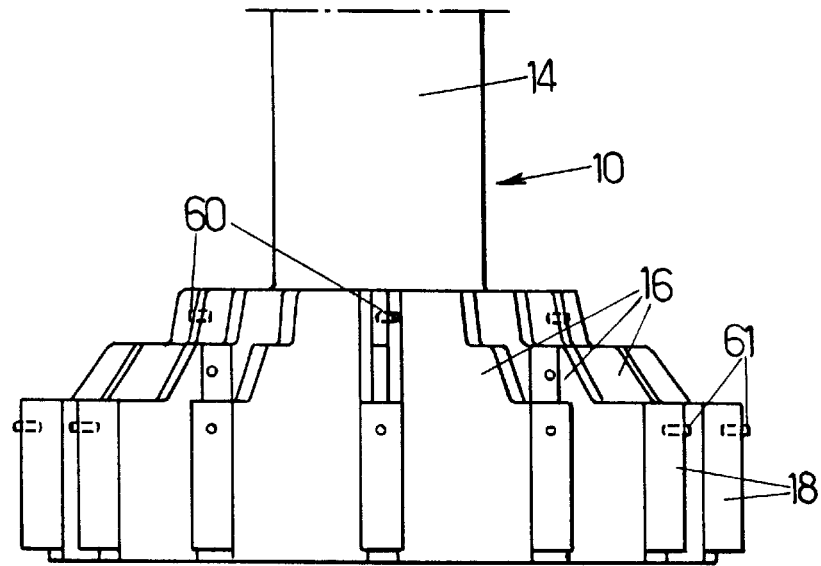
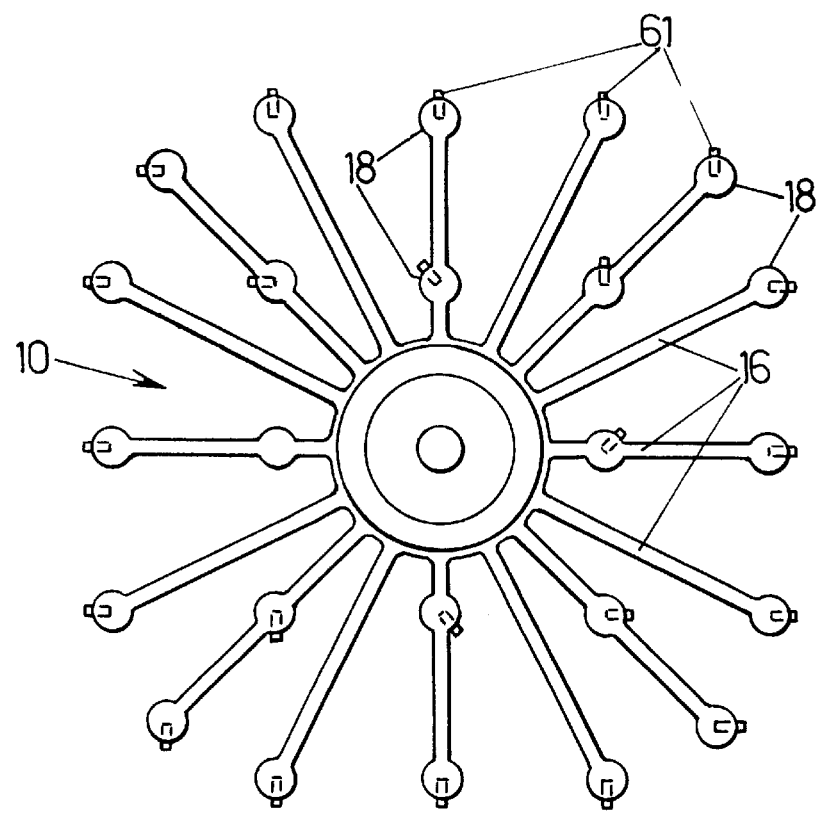
FIG.14.

NUCLEAR REACTOR CONTROL CLUSTER HAVING REMOVABLE RODS

BACKGROUND OF THE INVENTION

The present invention relates to control clusters for a nuclear reactor, each cluster comprising a spider made of a hub fitted with drive shaft fastening means and with fins radiating from a bottom portion of the hub and provided with parallel vertical fingers distributed in a regular array, together with rods provided with plugs fixed removably to the fingers.

At present, control clusters of this type include sixteen fins. Each fin carries a finger at its end. Every other fin also has an intermediate finger. Thus, the cluster includes twenty-four absorbent rods.

Spiders are presently constituted as welded assemblies. The fins are put into place around the hub and brazed. The brazing operation is lengthy and difficult when seeking to avoid any positioning error of the rods and to avoid any deformation due to thermal effects.

In most cases, the fingers are fixed to the fins by respective tenon-and-mortise connections: the end portion of each fin constitutes a tenon which is engaged in a slot of the associated finger. That connection is finished off by brazing. When this solution is adopted, it is impossible to provide a vertical hole passing through the finger, and consequently the plugs of the rods must be fixed in blind holes in the portions of the fingers located beneath the level of the fins. That solution has turned out to be not very satisfactory. French Patent No. 2,599,884 describes a solution that makes it possible to make the rods removable. It is complex and gives the rod assembly a secured connection with the spider. Such a connection is liable to impede sliding of the rods in the guide tubes of an assembly that is to receive the cluster.

SUMMARY OF THE INVENTION

An object of the invention is to provide an improved control cluster. For this purpose, in an important aspect of the invention, the invention provides a control cluster in which the fins, their fingers, and the bottom portion of the hub constitute a single unitary piece obtained by molding or by electro-machining.

The top portion of the hub may be integral with the bottom portion; this generally requires manufacture by electro-erosion.

In an advantageous embodiment, the top portion of the hub, constituted by a single cylindrical sleeve, is made separately from the single piece and is engaged in the bottom portion and is connected thereto, e.g., by means of a threaded connection or by welding.

The above design makes it possible to considerably simplify the structure and assembly of the damper generally provided in the spider to reduce the shock to which the top endpiece of the fuel assembly receiving the cluster is subjected when the cluster is dropped for a scram. Conventionally, the shock absorber comprises a socket that slides in the hub and that is urged downward by a spring toward a position in which it projects from the hub. The projecting position of the socket is defined by an abutment constituted by the head of a screw placed axially in the hub. That structure requires initial adjustment of the screw. Also, the presence of the screw impedes the flow of cooling liquid along the hub and, by a dash-pot effect, lengthens the time required for the cluster to drop.

When the sleeve is made up of two parts, it is possible to provide an internal collar in the bottom portion situated at a suitable location and constituting an abutment that defines the projecting position of the socket.

In addition, in an internal flare of the sleeve on which the spring bears, it is advantageous to provide a hole allowing cooling fluid to flow through the socket and the sleeve, thereby reducing the dash-pot effect.

Another object of the invention, which can be achieved regardless of whether some of the preceding dispositions are used, consists in allowing the rods a degree of freedom or "looseness" enabling them to adapt to the exact location of the guide tubes designed to receive them in the fuel assemblies and/or guide sheaths in which the clusters are housed when they are raised into the upper internals of a reactor, in the event of misalignment due to manufacturing tolerances.

To this end, the invention proposes a cluster whose plugs include, between the rods and the means for fixing to the fingers, an extension having at least one portion of reduced diameter for increasing its flexibility.

Because of the one-piece structure of the fingers and of the fins, through holes can be formed in the fingers to enable easily-released fixing for replacement of some of the rods.

Finally, it should be mentioned that the "loose" nature of the way in which the rods are mounted can be advantageous even with a spider that does not have the above-defined structure, e.g., a spider of the kind constituting the subject matter of above-mentioned French Patent No. 2,599,884.

The above characteristics and others will appear more clearly on reading the following description of particular embodiments of the invention given by way of example, and by the comparison made thereof with prior art dispositions. The description refers to the accompanying drawings.

BRIEF DESCRIPTION OF THE DRAWINGS

FIG. 6 is similar to FIG. 5 and shows another embodiment of the invention in which the spider comprises two parts;

FIG. 7 is similar to FIG. 6 and shows another two-part spider together with a possible structure of the shock absorber that can be used with a two-part spider;

FIGS. 7A, 7B and 7c, similar to FIG. 7, show modified embodiments;

FIG. 13 is an overall elevation view showing a possible distribution of rotary locking pegs on the spider; and FIG. 14 is a plan view of FIG. 13.

DETAILED DESCRIPTION PREFERRED EMBODIMENT

Figure 1:
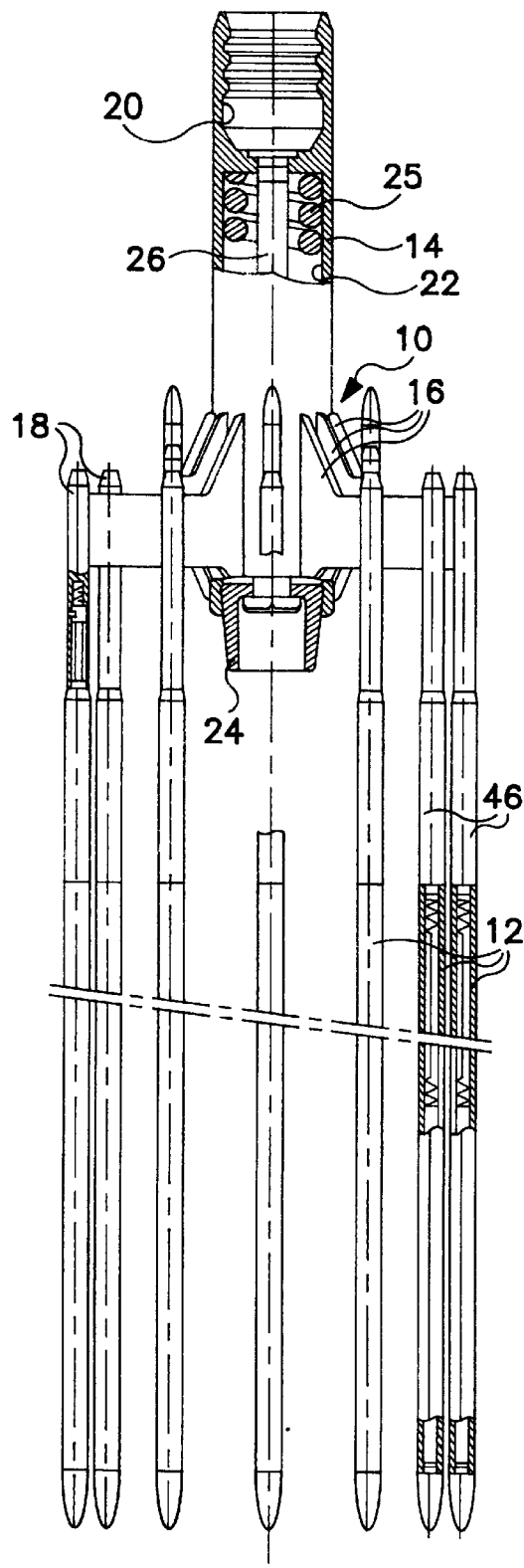
FIG. 1 is an elevation and fragmentary section view of a cluster of a type that is presently in use.

The control cluster shown in FIG. 1 comprises a spider 10 having twenty-four rods 12 suspended therefrom. The spider comprises a hub 14 from which sixteen fins 16 are mounted to radial carrying fingers 18 in which the top end plugs of absorbent rods 12 are fixed. The fingers 18 project well away from the fins in a downward direction.

A counterbore 20 is formed in the hub 14 and has grooves for receiving a device (not shown) for connection to a drive shaft for displacing the cluster vertically. In the bottom portion of the hub there is provided a bore 22 for receiving a shock absorber. The shock absorber comprises a socket 24 and a spring 25 bearing against an internal partition separating the bore from the counterbore. A screw 26 whose position is adjusted by being screwed into tapping formed through the partition serves to fix the rest position of the socket 24, in which position it projects downwards from the hub. After adjustment, the screw is locked into place by being welded to the bottom of the counterbore 20.

Figure 2:
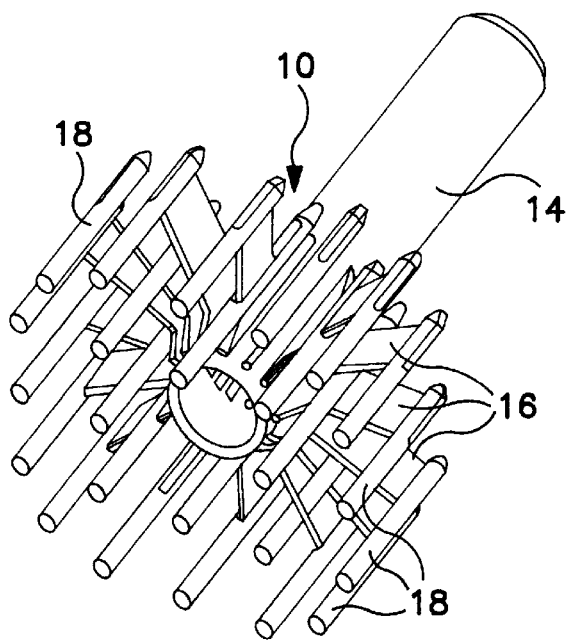
FIG. 2 is a perspective view of a prior art cluster spider, showing how the fingers are connected to the fins.

The fins are conventionally fixed to the hub by brazing. In FIG. 2, the fingers 18 are fixed to the fins by a tenon-and-mortise joint and by brazing. The terminal portion (or intermediate portion for the inner fingers) constitutes a tenon which is engaged in a slot in the finger, which slot constitutes a mortise.

In the prior art, each finger is formed with by a tapped blind hole for fixing the plug 26 of a rod 12. This blind hole cannot extend beyond the bottom edge of the fins because of the tenon-and-mortise assembly.

Figure 3:
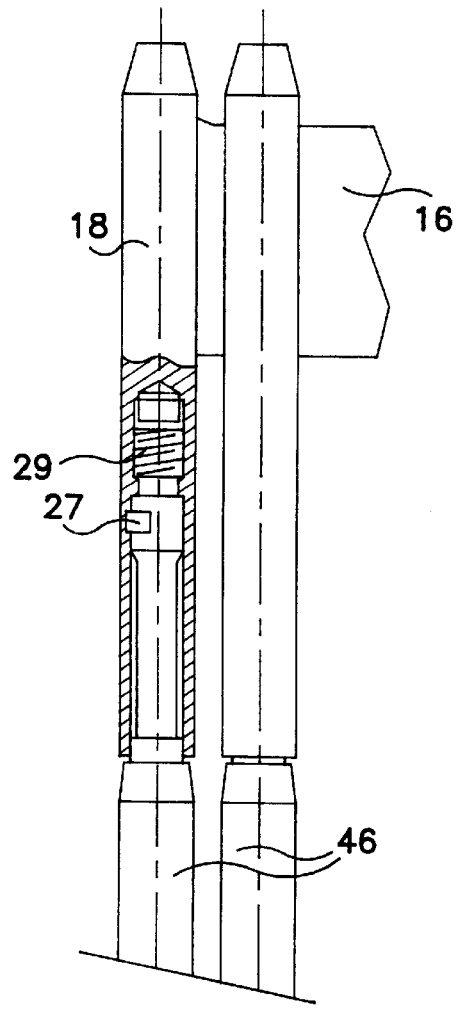
FIG. 3 is a view on a larger scale and in section on a vertical plane, showing how rods are fixed to a finger of the kind used according to the prior art.

FIG. 3 shows one possible way of fixing a rod in the tapped blind hole of a finger 18. An extension of the plug is terminated by a threaded length 29 which is screwed into a tapped portion of the hole. Between the threaded length and the plug proper 46, there is provided a portion of smaller diameter situated between two bulges. A pin or peg 27 locks the connection.

Figure 4:
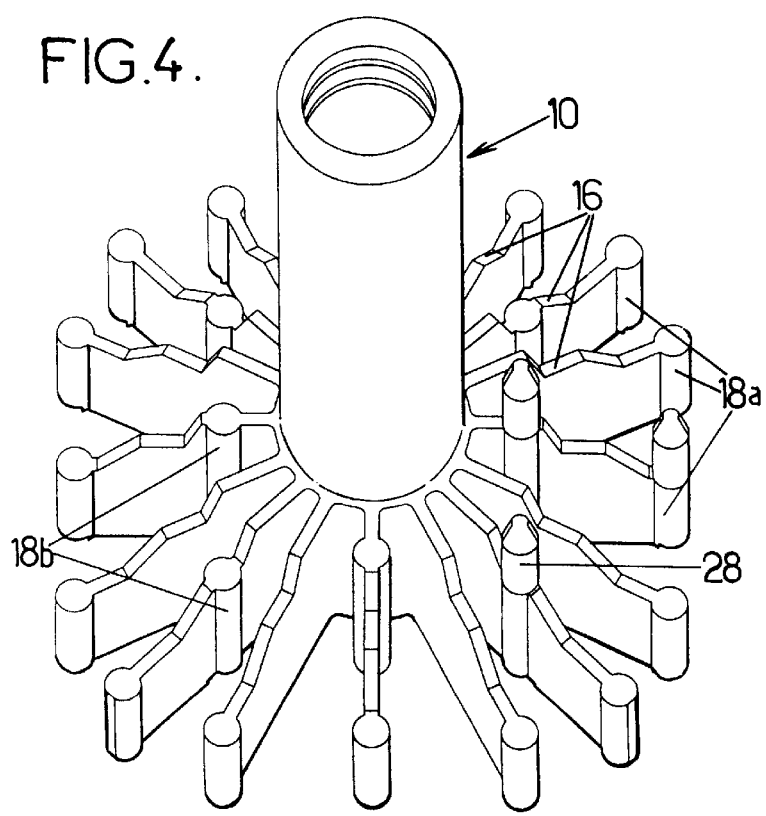
FIG. 4 is a perspective view of a single-piece cluster spider constituting a first embodiment of the invention.

FIG. 4 shows the structure of a spider constituting a first embodiment of the invention. The spider is made as a single piece that is either molded directly or obtained by electro-erosion. To make it easier to mold, the edges of the fins are constituted by flat portions that are mutually parallel, constituting steps that are interconnected by sloping flat portions. The end fingers 18a are of a height that corresponds exactly to that of the portions of the fins 16 remote from the axis of the hub. The intermediate fingers 18b have the same height as the portions of the fins that are nearer to the axis of the hub. FIG. 4 does not show the bores formed along the axes of the fingers, but it does show some of the bullet-shaped nuts 28 for fixing rod plugs.

The spider shown in FIG. 4 can receive a shock absorber of the same kind as that shown in FIG. 1.

Figure 5:
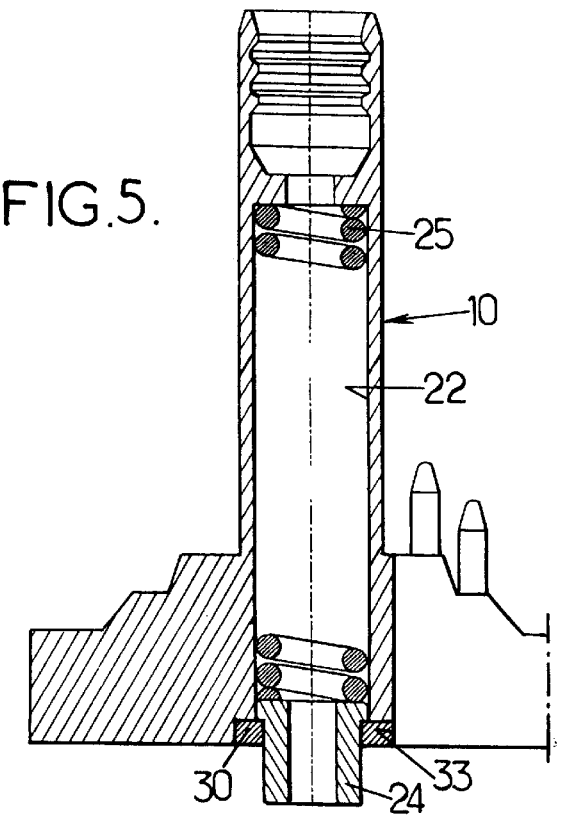
FIG. 5 is a section view on a vertical plane showing a possible structure for a shock absorber in a spider of the kind shown in FIG. 4.

Nevertheless, in order to facilitate manufacture and assembly, it is advantageous to adopt the disposition shown in FIG. 5, where members corresponding to those of FIG. 1 are given the same reference numerals. The rest position taken up by the socket 24 under drive from the spring 25 is fixed by bearing against a washer 30 mounted in an end counterbore 33 of the bore 22 and welded into place. The socket 24 has a shoulder enabling it to bear against the inside portion of the top face of the washer 30.

In the embodiment shown in FIG. 6, the spider is in two parts. It comprises firstly a tubular part or sleeve 14a constituting the top portion of the hub, and secondly a one-piece bottom part comprising the bottom portion of the hub together with the fins 16 and the fingers 18.

The sleeve 14a is machined. The bottom portion which includes the bottom portion of the hub, the fins, and the fingers is obtained by molding a solid part or by electro-erosion. The connection between the top portion 14a and the bottom portion can be achieved in various ways. As shown in FIG. 6, a cylindrical step is machined in the top end of the bottom portion. The bottom end of the top portion 14a has a complementary step that engages in the bottom portion. A circular weld 42 serves to hold together the two portions of the spider. The bores 22 formed in each of the two portions have the same diameter so as to avoid any discontinuity in the bore.

In the modified embodiment shown in FIG. 7, the connection between the bottom end of the top portion and the bottom portion is a screw connection. For this purpose, the upper portion of the fraction of the bore situated in the bottom portion of the spider is tapped while the sleeve is threaded. Thus, the two portions of the spider can be fixed together by screw engagement until the shoulder 44 of the upper portion presses against the top end of the fins.

The spider structures shown in FIGS. 6 and 7 enable the shock absorber to be assembled without any additional element for retaining the socket 24. It suffices to provide a lip 34 -at the bottom end of the bore in the bottom portion against which a shoulder formed on the socket 24 can bear. The socket 24 and the spring 25 are put into place prior to the sleeve being assembled on the bottom portion of the spider (FIG. 7).

This shock absorber structure makes it possible to provide a cooling fluid flow duct through the spider. No screw is required. The cooling fluid can flow along an internal channel 36 in the socket and through a central hole 38 in the collar against which the spring 25 bears. There is no longer any need to adjust and weld a screw.

Figure 7A:
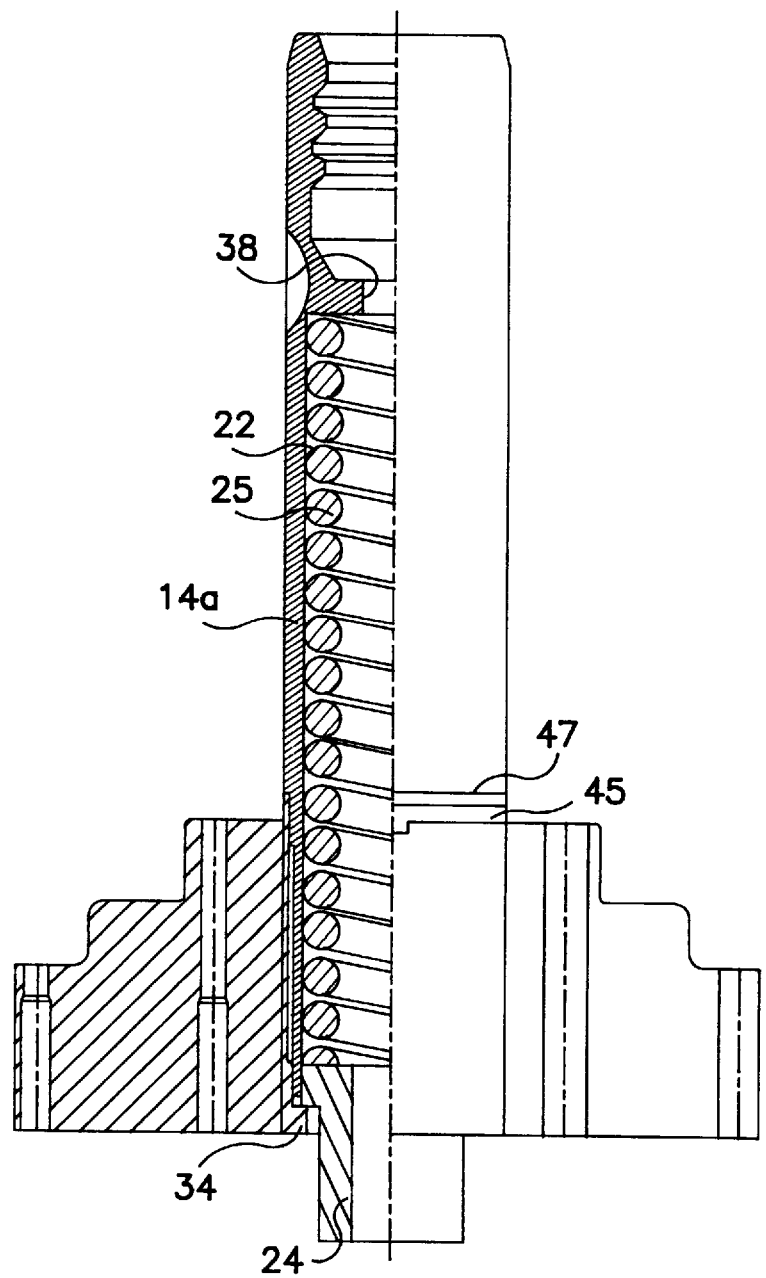

The arrangement illustrated in FIG. 7A mainly differs from that of FIG. 7 in that there is a thimble 45 for locking against rotation, so as to prevent the threaded connection between the bottom part and the lower end of the top part from unthreading. The thimble 45 is in abutment against the shoulder of the top portion and has at least one finger which engages into a slot of the bottom portion. After the top portion has been screwed down, the thimble is secured by some welding points at 47.

Figure 7B:
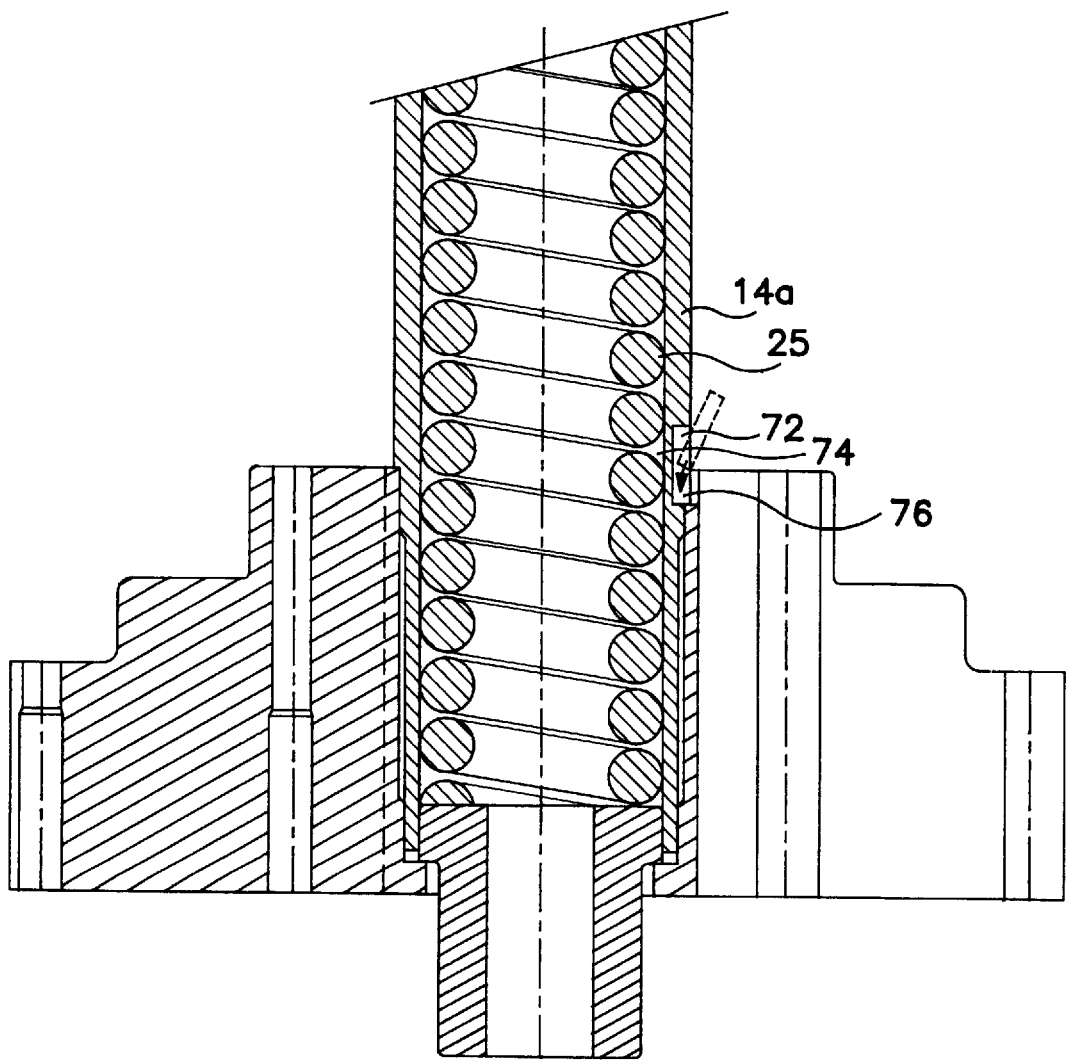

The modification shown in FIG. 7B differs from that of FIG. 7A in that the thimble 45 is replaced with a key 72 located in a recess 74 of the top portion and projecting into a slot 76 of the bottom portion. The parts are again screwed into each other and the recess 74 and slot 76 are located in front of each other. The key, which preferably has half-cylindrical ends, is slid into place as indicated by an arrow. It is then secured to the top portion by welding along its upper edge.

In FIG. 7C, the smooth bore of the bottom portion has a lower counterbore for receiving a nut 78 apt to be screwed on the threaded end portion of hub 14A. After the nut has been screwed down, it may be secured by welding at points 80, through the metal, between two fins.

The rods can be fixed to the spiders shown in FIGS. 4, 6, and 7–7C by means of the type described in the above-mentioned French Patent No. 2,599,884.

Nevertheless, it is preferable to adopt one of the dispositions described below which give flexibility to the cluster of rods facilitating insertion into the guide tubes of an assembly or of guide sheaths in the upper internal of the reactor.

Figure 8:
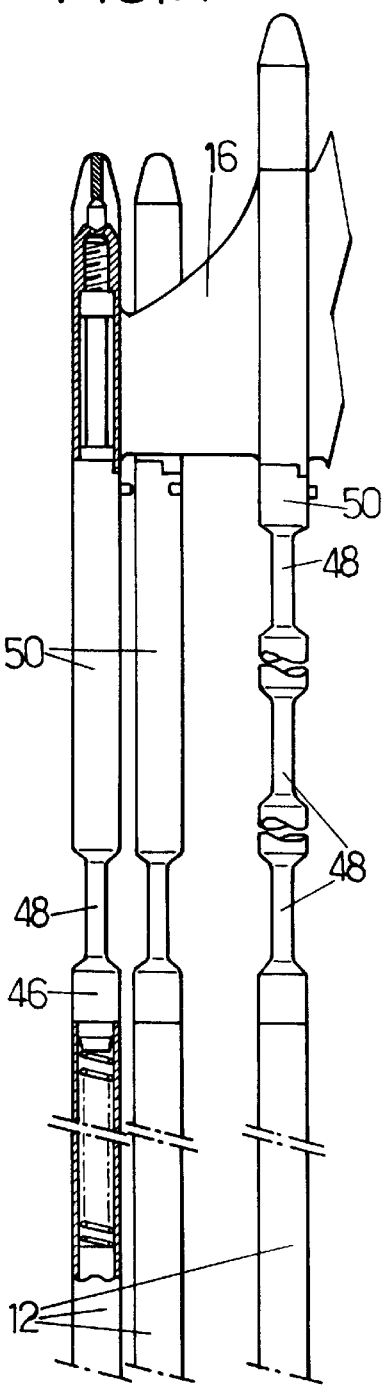
FIG. 8 is a vertical section view showing a possible way of mounting the rods, imparting a "loose" characteristic thereto.

In the case shown in FIG. 8, each rod 12 has a plug 46 provided with an extension having one or more portions 48 of small section, and rounded connections with adjacent portions of nominal diameter to avoid breakage starters. There may be up to three generally-cylindrical portions of small section. The end portion 50 of the extension may also be fixed to the respective finger by means of the kind described in the above-mentioned French patent document.

Figure 9:
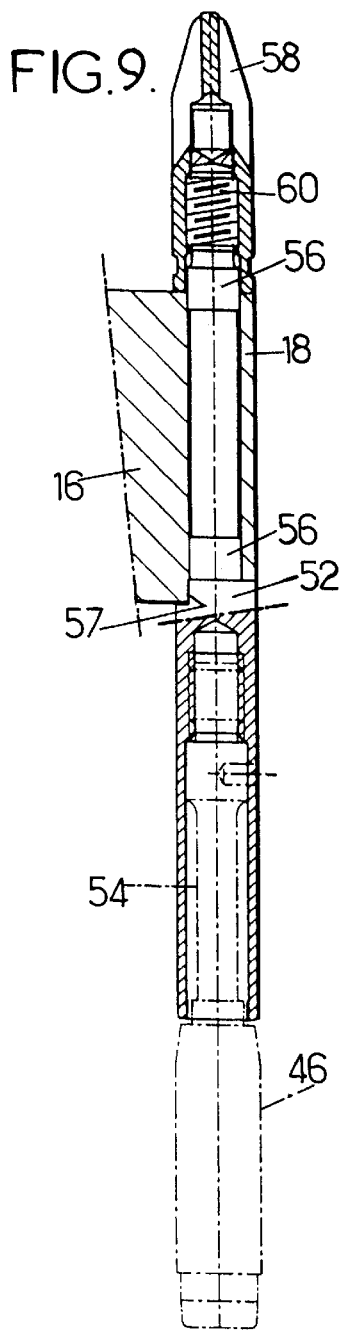
FIGS. 9 and 10 are similar to FIG. 8 and show variant embodiments.

In the variant shown in FIG. 9, the fixing means still comprise an extension of the plug 46. The extension has a portion 54 of small diameter located between two swellings. It is fixed in a connector 52. The connector 52 has two cylindrical bearing surfaces 56 on either side of the length of small diameter. Only the bearing surfaces bear against the wall of an open bore formed in the finger 18. A flat 57 in the bore receives a flat on the connector 52 so as to prevent the connector from rotating.

The top bearing surface 56 extends beyond the upper surface of the finger and guides a cap shaped nut 58 screwed onto the threaded terminal portion of the extender. When the cap nut is tightened, it presses a shoulder of the extender 52 against the bottom edge of the finger.

Once the nut has been fully tightened, it can be prevented from rotating by deforming a thin ferrule of the kind described in French Patent No. 2,599,884.

Figure 10:
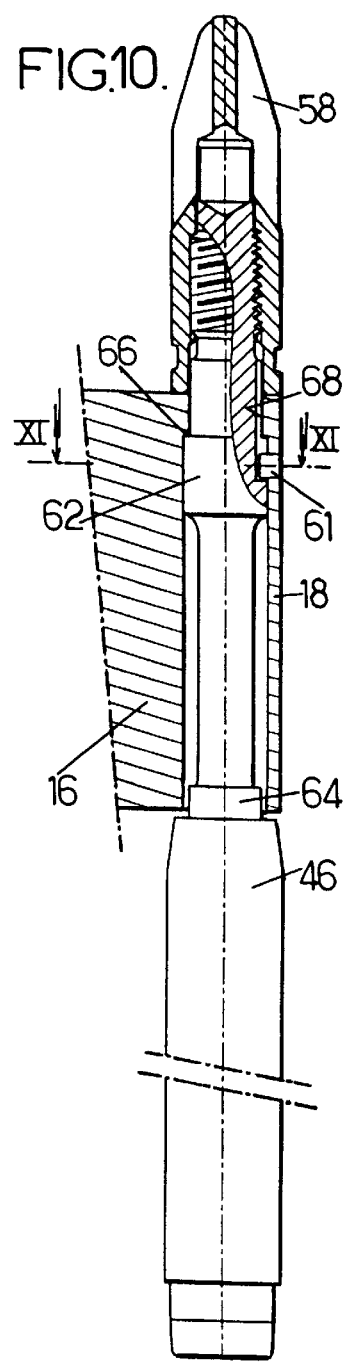
Figure 11:
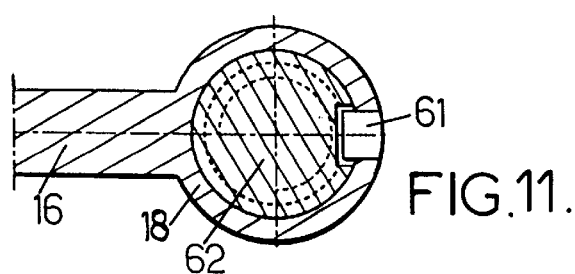
FIG. 11 is a section view on line XI—XI of FIG. 10.

In the variant shown in FIGS. 10 and 11, the plug 46 of the rod is fixed to the finger 18 by an extension of a structure such that the rod is slightly loose. The extension has a threaded terminal portion for receiving a cap similar to that of FIG. 9. A pin or peg 61 prevents the plug from rotating. A groove 68 may be formed in the extension to enable it to be engaged when the pin is in place. The extension also presents a portion of small section situated in the hole of the finger and lying between two projections, swellings or bulges 62 and 64. The top swelling 62 has a sliding fit in the hole and has a centering function. The diameter of the bottom swelling 64 is slightly smaller than that of the hole so as to allow the rod a limited amount of lateral movement.

An internal shoulder 66 may be provided in the hole for receiving the extension to constitute a bearing surface for the top face of the swelling 62.

Figure 12:
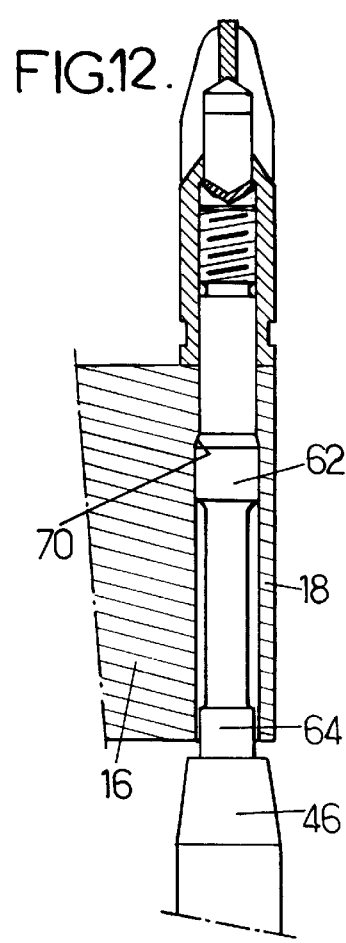
FIG. 12 is similar to FIG. 8 and shows yet another variant.

The embodiment shown in FIG. 12 differs from that of FIG. 10 essentially in that the projection 62 is connected to a portion of smaller diameter via a frustoconical zone 70 that co-operates with a corresponding portion of the hole to hold the rod in translation. The rod is prevented from rotating during assembly or disassembly by tooling (not shown). A portion of reduced section and/or a set of bottom swellings also ensure that the rod can move laterally.

Figure 12A:
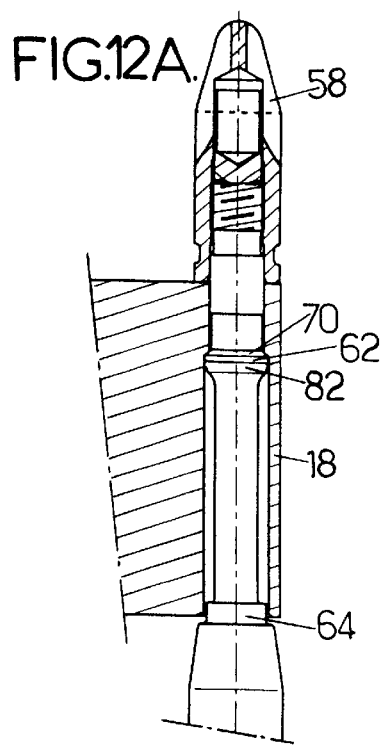
FIG. 12A illustrates a modification of FIG. 12.

The modified embodiment illustrated in FIG. 12A is designed for providing an accurate degree of centering of the extension of the fuel rod into the finger 18 and at the same time to prevent jamming due to tilting when the fuel rod is mounted or dismounted. For that, the projection 62 has a very short cylindrical portion (lesser than 1 mm) extended upwardly by a frusto-conical abutment zone 70, having an apex angle of about 110°, and extending downwardly as a frusto-conical zone 82 merging with the portion of reduced diameter.

FIG. 13 and 14 show a possible distribution for locking pegs or pins 61 used in the embodiment of FIG. 10. This distribution gives easy access to all of the pegs 61 for installation or removal purposes.

We claim:

1. A control cluster for controlling a nuclear reactor, comprising:
    (a) a spider including:
        a cylindrical sleeve having an axis, provided with means for connection to a drive shaft in an upper portion thereof,
        a monolithic bottom part comprising a central portion coaxial with said cylindrical sleeve and having a threaded or welded connection with a lower end of said sleeve, a plurality of fins unitary with said central portion, angularly distributed about said bottom part and directed substantially radially from said central portion, each of said fins having at least one vertical finger formed with a vertical through hole opening into a lower end surface and into an upper end surface of the respective finger,
        said cylindrical sleeve and central portion defining an axial bore,
    (b) a shock absorber having a socket slidable in said axial bore and spring means in said axial bore for urging said socket towards a position in which it projects downwardly from said spider and is in abutment against abutment means fast with said central portion;
    (c) a plurality of vertical control rods each having an upper plug formed with an upward extension traversing one of said through-hole and projecting upwardly out of the through-hole,
    wherein each said extension has at least two longitudinally spaced radially enlarged portions located within the through-hole, separated by at least one portion of reduced diameter, an upper one of said enlarged portions being slidably received in the respective through-hole for guiding the plug and being retained in abutment against shoulder means in the through hole by a nut in abutting contact with an upper surface of the respective finger and secured on a threaded upper end portion of the extension located entirely out of said through hole and a lower one of said enlarged portions having a diameter slighter than a diameter of said upper one for allowing a limited amount of lateral movement.

2. A control cluster according to claim 1, wherein said abutment means consists of an internal lower flange of said bore integral with said bottom part.

3. A control cluster according to claim 1, wherein said upper radially enlarged portion has a short cylindrical portion extending upwardly by a frustoconical abutment zone having an apex angle of about 110° and downwardly by a frusto-conical zone merging with the portion of reduced diameter.

4. A control cluster according to claim 1, wherein said closing plug has at least one further axial portion of reduced diameter under the lower one of said radially enlarged portions.

5. A control cluster according to claim 1, further having a plurality of pins each engaged through a wall of a respective one of said fingers into a groove of a respective one of said plugs for preventing the plug from rotating, each of said pins which locks one of said fingers which is at an intermediate location on one said fin being in a direction oblique with respect to the respective fin.

* * * * *